(12) United States Patent
Boban et al.

(10) Patent No.: US 11,168,810 B2
(45) Date of Patent: Nov. 9, 2021

(54) HYDRAULIC VALVE AND ACTUATOR FOR HYDRAULIC VALVE

(71) Applicant: ECO Holding 1 GmbH, Marktheidenfeld (DE)

(72) Inventors: Drazen Boban, Nuertingen (DE); Thomas Jacob, Stuttgart (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 12 days.

(21) Appl. No.: 16/527,366

(22) Filed: Jul. 31, 2019

(65) Prior Publication Data

US 2020/0041029 A1    Feb. 6, 2020

(30) Foreign Application Priority Data

Aug. 2, 2018 (DE) .......................... 102018118754.8

(51) Int. Cl.
    *F16K 31/42*              (2006.01)

(52) U.S. Cl.
    CPC ................................. *F16K 31/426* (2013.01)

(58) Field of Classification Search
    CPC ............... F16K 31/426; F16K 31/0693; F16K 31/0613; F16K 27/048; F16K 47/08; H01F 7/08
See application file for complete search history.

(56) References Cited

U.S. PATENT DOCUMENTS

| 4,836,249 A | * | 6/1989 | LaPointe | ................. | F15B 13/04 |
| | | | | | 137/596.2 |
| 2004/0159812 A1 | * | 8/2004 | Kaneda | ............... | F16K 31/0613 |
| | | | | | 251/129.15 |

FOREIGN PATENT DOCUMENTS

| DE | 102016108067 A1 | | 2/2017 | | |
| EP | 1681466 A2 | * | 7/2006 | .......... | F04B 27/1036 |
| EP | 2977607 A1 | | 1/2016 | | |

\* cited by examiner

*Primary Examiner* — Kenneth Rinehart
*Assistant Examiner* — Nicole Gardner
(74) *Attorney, Agent, or Firm* — Von Rohrscheidt Patents

(57) ABSTRACT

A hydraulic valve including a valve housing; and a valve piston that is axially movable in the valve housing along a first longitudinal axis of the valve housing, wherein the valve housing includes a supply connection for feeding a hydraulic fluid, at least one operating connection and at least one tank connection for draining the hydraulic fluid, wherein the valve piston is movable by an electromagnetic actuator of the hydraulic valve, wherein the valve housing forms a hydraulic portion and the actuator forms a magnet portion of the hydraulic valve, wherein a divider element is arranged between the hydraulic portion and the magnet portion, and wherein the divider element is configured to provide a flow connection between the hydraulic portion and the magnet portion and vice versa.

23 Claims, 5 Drawing Sheets

HYDRAULIC VALVE AND ACTUATOR FOR HYDRAULIC VALVE

RELATED APPLICATIONS

This application claims priority from German patent applications DE 10 2018 118 671.1 filed on Aug. 1, 2018 and DE 10 2019 116 863.5 filed on Jun. 24, 2019, all of which are incorporated in their entirely by this reference.

FIELD OF THE INVENTION

The invention relates to a hydraulic valve. The invention also relates to an actuator for a hydraulic valve.

BACKGROUND OF THE INVENTION

Hydraulic valves, in particular for automotive applications and in particular for cam phasers or in particular for twin clutch transmissions are well known in the art. Thus, a hydraulic valve in particular for a clutch transmission can be derived e.g. from DE 10 2016 108 067 A1. The hydraulic valve includes a valve piston which is supported axially movable in a valve housing of the hydraulic valve. Typically at least an operating connection, a supply connection and a tank connection are configured at the valve housing. A hydraulic fluid flowing through the hydraulic valve can take different flow paths through the hydraulic valve as a function of a position of a valve piston in the valve housing.

During operations of the hydraulic valve contaminated hydraulic fluid can lead to restrictions of movements of a valve piston and of an actuator that initiates the movements of the valve piston. A direct connection of the magnet portion of the hydraulic valve, put differently of the magnet portion and the hydraulic portion of the hydraulic valve, facilitates a circulation of contaminated hydraulic fluid that includes dirt particles. In order for dirt particles not to reach the magnet portion an impenetrate able separation element is arranged between the hydraulic portion and the magnet portion.

BRIEF SUMMARY OF THE INVENTION

Thus, it is an object of the instant invention to provide an improved hydraulic valve wherein a divider element of the improved hydraulic valve facilitates improved response properties of the hydraulic valve. It is another object of the invention to provide an improved actuator for a hydraulic valve.

The object is achieved according to the invention by A hydraulic valve including a valve housing; and a valve piston that is axially movable in the valve housing along a first longitudinal axis of the valve housing, wherein the valve housing includes a supply connection for feeding a hydraulic fluid, at least one operating connection and at least one tank connection for draining the hydraulic fluid, wherein the valve piston is movable by an electromagnetic actuator of the hydraulic valve, wherein the valve housing forms a hydraulic portion and the actuator forms a magnet portion of the hydraulic valve, wherein a divider element is arranged between the hydraulic portion and the magnet portion, and wherein the divider element is configured to provide a flow connection between the hydraulic portion and the magnet portion and vice versa.

The object is also achieved by an electromagnetic actuator for a hydraulic valve, wherein a valve piston of the hydraulic valve is movable by the electromagnetic actuator and the electromagnetic actuator forms a magnet portion of the hydraulic valve, wherein a divider element is arranged between the hydraulic valve and the magnet portion, and wherein the divider element is configured to provide a flow connection of the hydraulic valve with the magnet portion and vice versa.

The hydraulic valve according to the invention includes a valve housing and a valve piston that is arranged axially movable in the valve housing along a first longitudinal axis of the valve housing. The valve housing is configured with a supply connection for feeding hydraulic fluid, at least one operating connection and at least one tank connection for draining the hydraulic fluid. The valve piston is movable by an electromagnetic actuator of the hydraulic valve. The valve housing forms a hydraulic portion and the actuator forms a magnet portion of the hydraulic valve. A divider element is arranged between the hydraulic portion and the magnet portion. According to the invention the divider element is configured to facilitate flow connections of the hydraulic portion with the magnet portion and vice versa. This means put differently that hydraulic fluid can flow from the hydraulic portion into the magnet portion using the divider element which assures a fluid supply for the magnet portion. Furthermore the divider element is configured to reliably vent the actuator. Thus, a flow connection is provided between the hydraulic portion and the magnet portion which implements a quicker and more reliable filling of the magnet portion with the hydraulic fluid and an improved ventilation of both components which improves response properties of the hydraulic valve. The flow connection can be provided in different ways.

Thus, the divider element can be penetrated by several channels that run through the divider element in an axial direction. Or the divider element only includes a single large channel that penetrates the divider element in the axial direction. In order to implement safety against penetration of contaminant particles the channels that penetrate the divider element should have flow cross sections that are as small as possible. Or the channel or the channels are provided with shoulders in axial direction in the divider element so that the contaminant particles can collect at the corresponding shoulders.

In order for the divider element to be simple to manufacture a flow communication has to be implemented by a connection channel that is configured at an enveloping surface of the divider element. This means that the divider element can be machined starting from its enveloping surface, wherein the connecting channel can be produced in a simple manner by milling a groove.

Put differently no time consuming and thus expensive fabrication processes are required. In order to retain contaminant particles when hydraulic fluid flows from the hydraulic portion into the magnet portion the connecting channel can include for example a sieve which retains the particles and which contacts a housing wall of the housing element in an installed condition of the divider element wherein the divider element is received in the housing element.

In another embodiment of the divider element the connecting channel is at least partially displaced over a circumference of the divider element and advantageously configured as a labyrinth. Thus, the hydraulic fluid can be cleaned from contaminant particles already while the connecting channel is being flowed through wherein the contaminant particles could otherwise accumulate at corners and floors of the connecting channel due to turns and windings in the connecting channel.

In an advantageous embodiment of the hydraulic valve the divider element includes a syphon. The syphon provides controlled and reliable deposition of contaminant particles. In particular when the syphon forms a section of the connecting channel a flow through of the siphon is assured. This means put differently that the hydraulic fluid has to flow through the syphon when flowing through the connecting channel so that contaminant particles can be deposited in the syphon.

Therefore the syphon is arranged in another advantageous embodiment in a direction of the longitudinal axis between a first section of the divider element and a second section of the divider element. This means the syphon is not configured at a beginning or at an end of the connection channel but in an intermediary portion of the connection channel.

In another embodiment of the hydraulic valve according to the invention the divider element is elastically deformable in a section that is position able towards the magnet portion. This means put differently that the divider element has significantly greater deformability compared to a press fit. This facilitates implementing an assembly without contamination and with limited force transfer while axially securing the divider element in position. The deformability can be configured e.g. with special deformation geometries like e.g. knurling or diamond knurling geometries. Furthermore these deformation geometries provide controlled deformability so that an opening that is provided in the divider element for moveable reception and support of a pin and/or of the valve piston is not deformed.

In particular in case the positionable section that is oriented towards the magnet portion has deformation geometries a threadable connection can be provided in a simple manner. For example the section oriented towards the valve piston can have a slightly smaller diameter so that it can be arranged in the corresponding housing portion without applying additional force and the positionable section that is oriented towards the magnet portion is positioned under deformation and with little force application wherein a desired relative sealing can be provided between the hydraulic portion and the magnet portion.

In another embodiment the divider element is made from a synthetic material. The divider element can also be made from metal or from a so called hybrid material, however, the divider element can be produced in a cost effective manner when the synthetic material is used.

In order to further reduce fabrication costs of the hydraulic valve the divider element is fixable by a press fit in a corresponding housing.

The hydraulic valve according to the invention is characterized in particular by a simple integration of complex labyrinth—syphon connection channel structures, secure support of the valve piston directly or indirectly by a pin and deformation portions in a single component that can be produced in a cost effective manner. The hydraulic valve can also be produced in a cost effective manner by using an automated lathe. Producing in particular the labyrinth—syphon and connection channel structures can be implemented in a master formed component without complex machining.

By the same token the connection channel and syphon geometries can be adapted to filling times and if necessary attenuations of an armature of the actuator and/or of the valve piston. By the same token a syphon volume is implementable to receive product specific plunger stroke volumes in the hydraulic valve.

The hydraulic valve according to the invention is furthermore characterized by variable positioning of the divider element and it is thus adaptable according to required installation positions in order to secure a hydraulic filling of the magnet portion and a bleeding of the magnet and hydraulic portion depending on its functional requirement and/or customer requirements.

This also leads to a simplification of geometries at interface components through integration of complex geometries at the divider element.

The actuator according to the invention for a hydraulic valve whose valve piston is movable by the electromagnetic actuator forms a magnet portion of the hydraulic valve. A divider element is arranged between the hydraulic valve and the magnet portion. According to the invention the divider element is configured to provide flow communication of the hydraulic valve with the magnet portion and vice versa.

This means put differently that hydraulic fluid can flow through the divider element through the hydraulic valve into the magnet portion which assures a fluid supply for the magnet portion. Furthermore the divider element is configured to provide reliable ventilation of the actuator. This provides flow connection between the hydraulic valve and the magnet portion which implements a quicker and more reliable filling of the magnet portion with the hydraulic fluid and an improved ventilation of both components which improve response properties of the hydraulic valve. The flow connection can be provided in different ways.

Advantageously the divider element is arranged in a pole tube of the actuator and/or a valve housing of the hydraulic valve.

BRIEF DESCRIPTION OF THE DRAWINGS

Further advantageous embodiments and improvements can be derived from the subsequent figures. The details and features that can be derived from the figures are not limited to the embodiments illustrated in the figures. Rather one or plural features can be combined with one or plural features from the description provided supra to form new embodiments. In particular the subsequent descriptions do not define limitations of the scope of the invention but they describe individual features and their possible cooperation. In the drawings: In the figures identical or equivalent components are designated with identical reference numerals. The figures only illustrate exemplary embodiments and do not limit the scope of the invention.

DETAILED DESCRIPTION OF THE INVENTION

Figure 1:
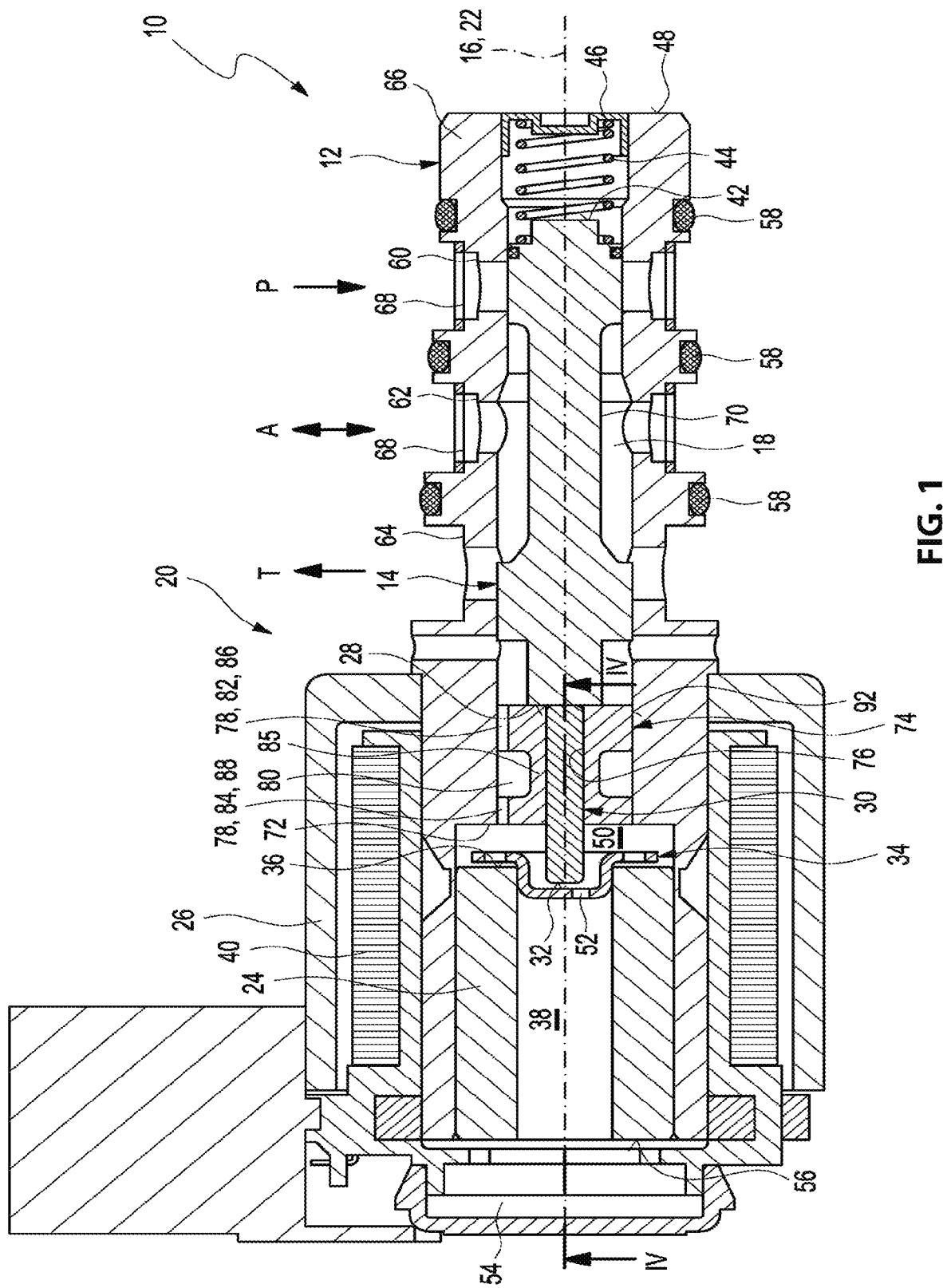
FIG. 1 illustrates a longitudinal sectional view of a hydraulic valve according to the invention in a first embodiment.

The hydraulic valve 10 according to the invention is configured according to FIG. 1. The hydraulic valve 10 which is configured as a proportional pressure regulator valve can be used e.g. in an automatic transmission. The hydraulic valve 10 that is illustrated in a longitudinal sectional view and which is configured similar to a cartridge valve includes a valve housing 12 also designated as hydraulic portion in which a valve piston 14 is arranged axially move able along a first longitudinal axis 16 of the valve housing 12 in a receiving opening 18. The receiving opening 18 is configured with shoulders. In order to axially position the valve piston 14 the hydraulic valve 10 includes an electromagnetic actuator 20. The actuator 20 and the valve housing 12 are arranged adjacent to each other wherein the first longitudinal axis 16 is configured coaxial with the second longitudinal axis 22 of the actuator 20.

In order to move the valve piston 14 an armature 24 of the actuator 20 is received axially movable along the second longitudinal axis 22 in a housing 26 of the actuator 20 which represents a magnet portion of the hydraulic valve 10.

The valve piston 14 is operatively connected with the armature 24 so that a first face 28 of the valve piston that is oriented towards the armature 24 contacts a transmission element 30 that is movable along the first longitudinal axis 16 and configured as a cylindrical pin. The pin 30 contacts an anti-stick element 34 with a pin face 32 that is oriented away from the valve piston 14 wherein the anti-stick element is arranged at an armature face 36 of the armature 24 that is oriented towards the face 32. Thus, an axial movement of the armature 24 is transferrable to the valve piston 14. The anti-stick element 34 is configured disc shaped and prevents an adhesion of the armature 24 at the magnetically conductive valve housing 12.

Furthermore the anti-stick element 34 substantially closes a flowable armature channel 38 which is configured centrally so that it extends along the second longitudinal axis 22 in the armature 24. The armature channel 38 is configured as a bore hole.

The armature 24 is moved electromagnetically wherein a coil that envelops the armature 24 is received in the housing 26 in order to apply an electromagnetic field. A current loading of the coil 40 causes an axial displacement of the valve piston 14 wherein a retaining element 44 imparts a retaining force upon the valve piston 14 at a second face 42 of the valve piston 14 that is oriented away from the first face 28 wherein the valve piston 14 has to be moved against the retaining force. The retaining element 44 is configured in this embodiment as a compression coil spring and supported at a cover 46 which is arranged with a press fit in the valve housing 12 at a housing face 48 which is configured oriented away from the actuator 20.

In the illustrated position of the hydraulic valve 10 an annular first space 50 is configured between the armature 24 and the valve housing 12. The first space 50 is flow connected by a flow opening 52 that is introduced into the anti-stick element 34 and that completely penetrates the anti-stick element in a direction of the longitudinal axes 16, 22 through the armature channel 38 with an annular second space 54 wherein the second space 54 is configured at a second armature face 56 of the armature 24 that is oriented away from the first armature face 36 and arranged between the second armature face 56 and the housing 26. This means that a pressure compensation between the spaces 50, 54 is possible anytime. Thus, the armature 24 only has to perform displacement work when the valve piston 14 is moved in a direction that is oriented away from the actuator 20 and the armature has a quick reaction time in order to adjust the valve piston 14.

The bushing shaped valve housing 12 which is sealed by seal elements 58 relative to a unit housing or a transmission housing includes a supply connection P, an operating connection A and a tank connection T. The supply connection P, the operating connection A and the tank connection T are associated with a first ring groove 60, a second ring groove 62 or a third ring groove 64 that are connected through respective non-illustrated connection channels with the connections. The ring grooves 60, 62, 64 are configured so that they completely penetrate a housing wall 66 of the valve housing 12. The valve housing 12 is configured integrally in one piece with the pole tube in this embodiment.

The supply connection P is configured in order to provide a connection with an oil pump that is not illustrated in detail so that the hydraulic valve 10 is supply able with the hydraulic fluid which is oil in this embodiment. The first ring groove 60 and the second ring groove 62 respectively include a screen 68 for filtering the hydraulic fluid.

The valve piston 14 includes a circumferential piston ring groove 70. Depending on the positioning of the valve piston 14 either the operating connection A is flow connected with the tank connection T as illustrated or the supply connection P is flow connected with the operating connection A.

In order to reliably guide and support the pin 30 and in order to seal the receiving opening 18 relative to the first space 50 the receiving opening 18 includes a divider element 74 at an end 72 that is arranged opposite to the armature 24.

The divider element 74 provides spatial separation of the magnet portion and the hydraulic portion of the hydraulic valve 10 and is advantageously received with the end 72 in the receiving opening 18 with a flush press fit.

The divider element 74 is configured as a hollow cylinder wherein the pin 30 is movably received in a central opening 76 that completely penetrates the divider element 74 in the axial direction. The valve piston 14 can also be integrally configured in one piece with the pin 30 wherein the divider element 74 receives the valve piston in a movable manner in its opening 76.

In order to implement a reliable filling and ventilation of the actuator 20 the divider element 74 is configured with a connection channel 78 that is arranged at its enveloping surface 92 and that extends in axial direction along the first longitudinal axis 16. The connection channel 78 flow connects the first space 50 with the receiving opening 18. Retaining contaminant particles that may be provided in the hydraulic fluid is performed by a capture element 80 of the divider element 74 which is configured as a syphon 80 in the instant embodiment. The syphon 80 is configured as an annular groove in the instant embodiment wherein the annular groove is arranged between a first element section 82 of the divider element 74 and a second element section 84 of the divider element 74, thus in a third element section 85 of the divider element 74 that is arranged between the first element section 82 and the second element section 84.

Figure 2:
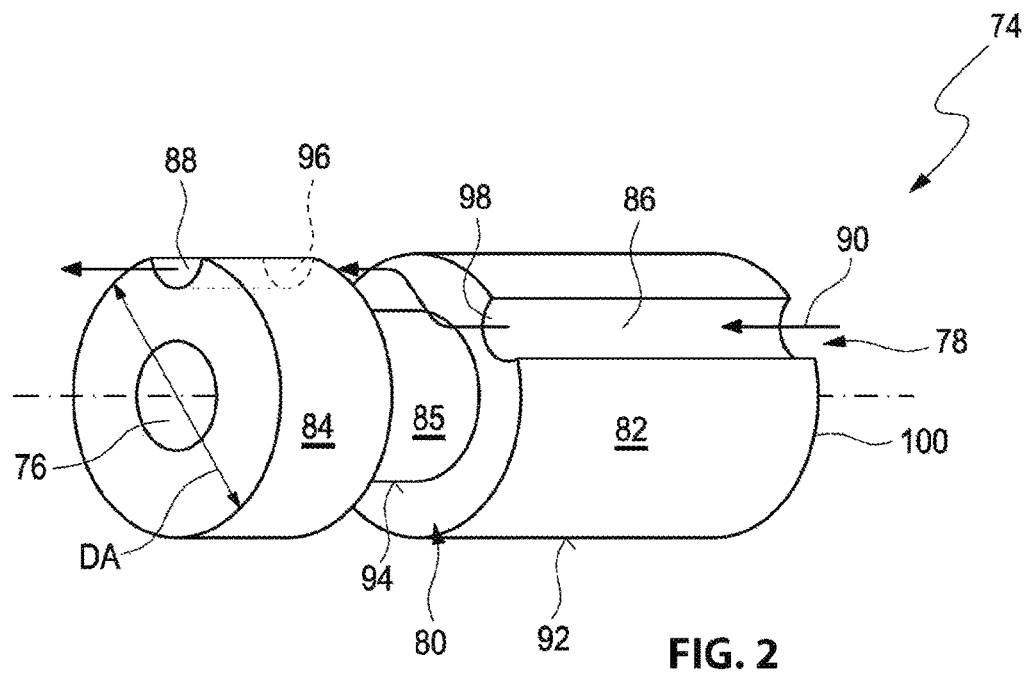
FIG. 2 illustrates a perspective view of a divider element of the hydraulic valve according to the invention in a second embodiment.
Figure 3:
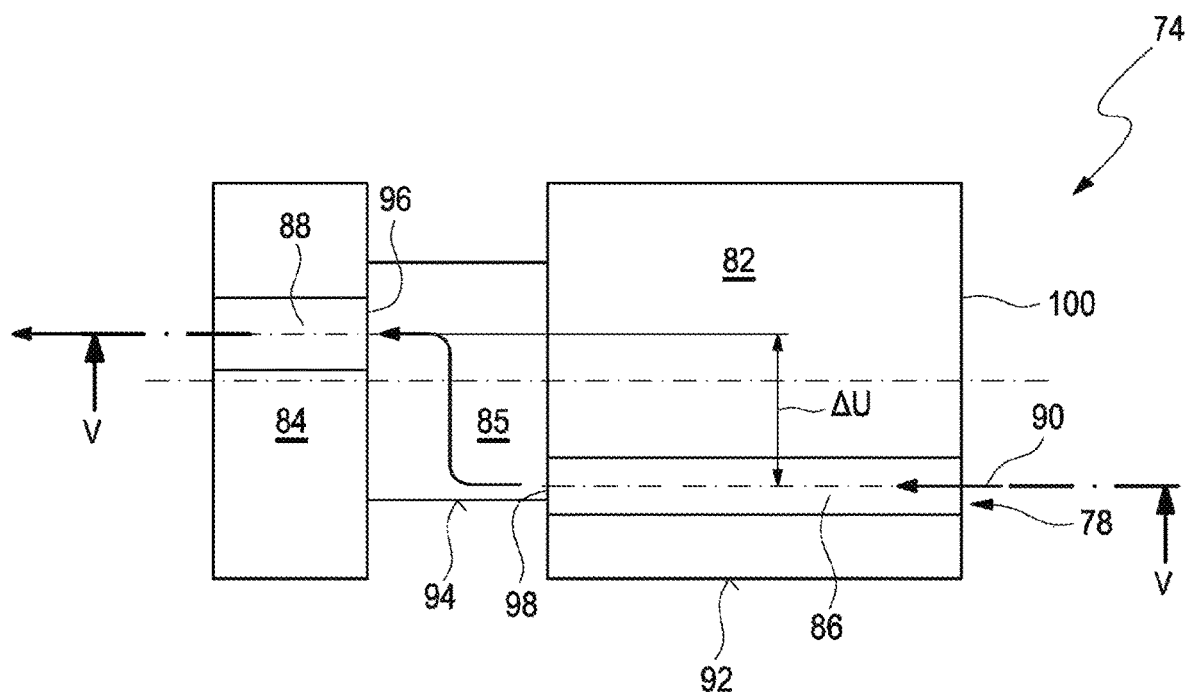
FIG. 3 illustrates a side view of the divider element according to FIG. 2.

FIGS. 2 and 3 show the divider element 74 of the hydraulic valve 10 in a second embodiment. The connection channel 78 is configured labyrinth shaped. This means put differently that a first channel section 86 of the connection channel 78 which is arranged in the first element section 82 is arranged offset in circumferential direction relative to a second channel section 88 of the connection channel 78 which is arranged in the second element section 84. Thus, the hydraulic fluid can flow in the axial direction through the first channel section 86 into the syphon 80 which is configured to capture or collect contaminant particles so that cleaned hydraulic fluid flows through the syphon 80 into the second channel section 88 and further into the first space 50 as illustrated by the flow direction 90. The deeper the syphon 80, this means put differently the greater a depth TF of the syphon 80 that is configured between a channel entry 96 of a second channel section 88 that is configured in the second element section 84 and a base surface 94 of the syphon 88, the more reliably contaminant particles are retained since the contaminant particles can collect in the portion between the channel entry 96 and the base 94 due to a density differential between the hydraulic fluid and the contaminant particles and the cleaned hydraulic fluid can flow through a syphon section 98 arranged there above into the second channel section 88.

A circumferential distance AU between the channel entry 96 of the second channel section 88 and a channel outlet 98 of the first channel section 86 configured downstream of the channel entry 96 can be adapted to the requirements and tasks of the hydraulic valve 10. The depth TF of the capture element 80 can be configured limited and then it is appropriate to configure the circumferential distance AU so that the contaminant particles can be reliably received in the capture element 80.

The second element section 84 is configured elastic. This means put differently that an outer diameter DA is configured variable and adaptable to an installation diameter ED in order to provide a simple arrangement in the housing section which is a section of the valve housing 12 or a section of the housing 26 that is to be associated with the actuator 20 depending on the application of the hydraulic valve 10. For this purpose the second element section 84 includes special receiving geometries compared to a press fit where the exterior diameter DA is also variably adjustable wherein the receiving geometries are deformable like e.g. knurling geometries and/or diamond knurling geometries. These receiving geometries which are configured as longitudinal grooves in the illustrated embodiment provide a simplified and in particular contamination free force limited assembly. Furthermore an axial position safety of the divider element 74 can be implemented in the installation space, this means in the corresponding housing section.

Figure 4:
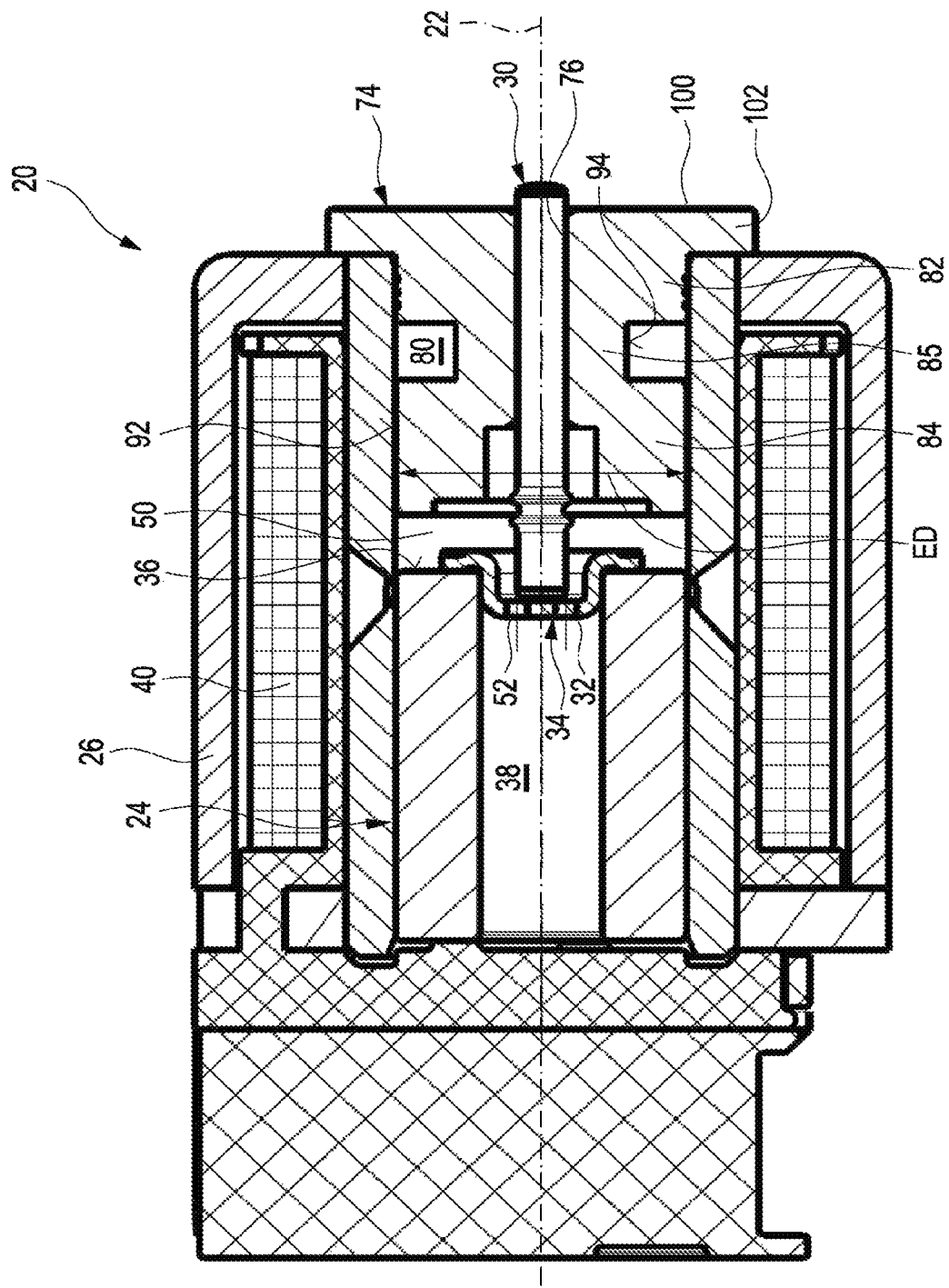
FIG. 4 illustrates a longitudinal sectional view along a sectional plane IV IV of an actuator with a divider element of the hydraulic valve according to the invention in a third embodiment.
Figure 5:
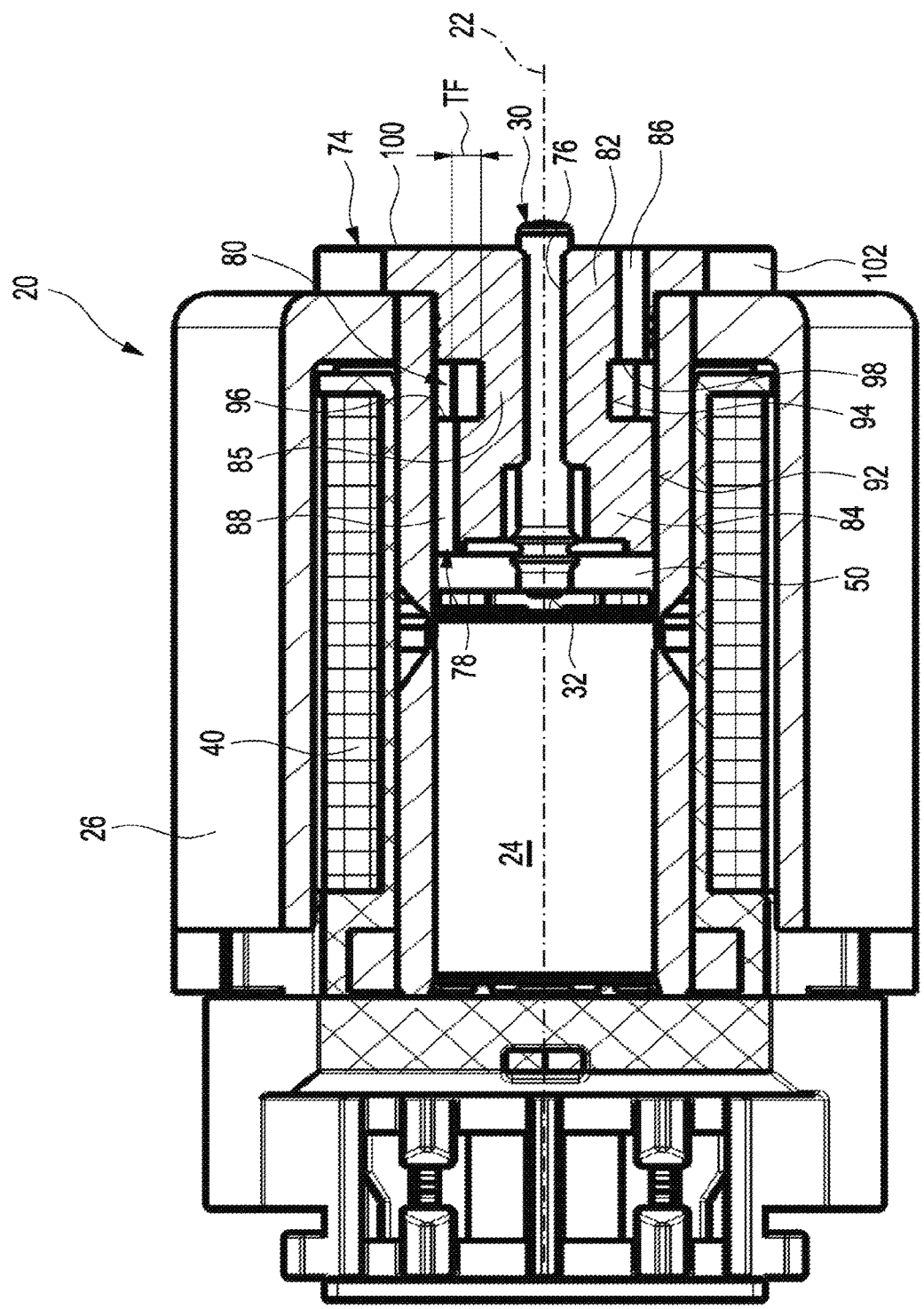
FIG. 5 illustrates a partial sectional view V-V along two perpendicular sectional planes of the actuator according to FIG. 4.

FIGS. 4 and 5 show the actuator 20 with the divider element 74 in a longitudinal sectional view along a sectional plane IV-IV in a partial sectional view V-V along two sectional planes that are arranged perpendicular to each other in a third embodiment. The channel sections 86 and 88 are arranged at a circumferential offset AU with a value of 90 degrees relative to each other. The divider element 74 includes a stop 102 at an element end 100 that is oriented away from the actuator 20 wherein the stop secures the actuator in position during assembly and operations of the hydraulic valve 10. Furthermore the stop 102 can provide a seal between the hydraulic portion and the magnet portion so that a flow connection is provided in a controlled and exclusive manner through the divider element 72 between the hydraulic portion and the magnet portion. The stop 102 is provided in an exemplary manner in a shape of an annular disc.

The divider element 74 can be produced in an economical manner e.g. as a sintered component, MIM component or similar. The divider element can be installed as a matter of principle into pole tubes, bushings, pole caps and other sections of the magnet portion and in the hydraulic portion. The divider element can be made from a synthetic material, a metal or a hybrid material. In particular the divider element can be adapted in a simple manner to different geometries of components and elements since the connection channel 78, the capture element 80 and the receiving geometries are being produced externally. This means put differently no complex master formed part has to be produced which has internal geometries that require complex fabrication so that its fabrication is time consuming and expensive. Instead the divider element 74 is provided with its essential functional sections through simple external machining, in particular by machining of grooves.

The divider element is advantageously configured to produce a press fit in the external opening.

Figure 6:
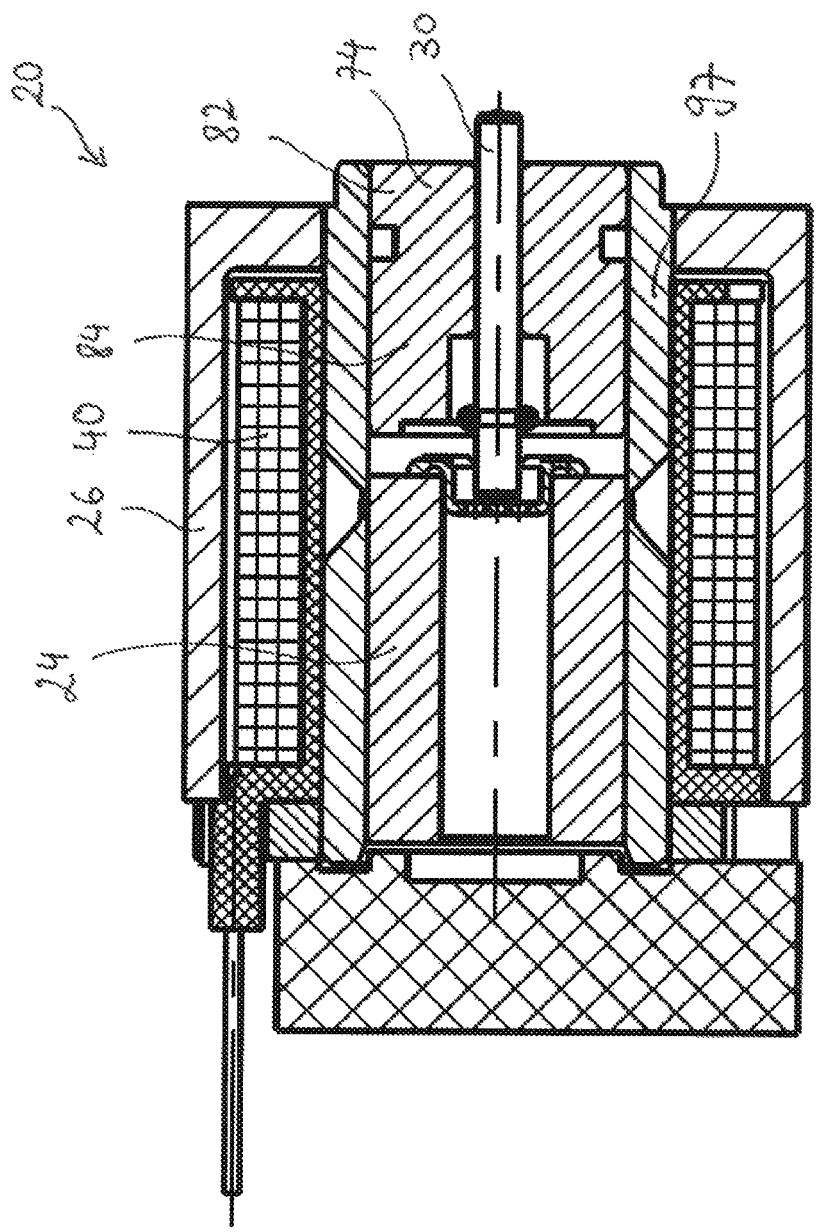
FIG. 6 illustrates a longitudinal sectional view of an actuator with a divider element of the hydraulic valve according to the invention in a fourth embodiment.

FIG. 6 illustrates a longitudinal sectional view of a fourth embodiment of an actuator 20 which differs from the preceding embodiment in that the divider element 74 does not include a face stop and is arranged in its entirety in the pole tube 97.

What is claimed is:

1. A hydraulic valve, comprising:
a valve housing; and
a valve piston that is axially movable in the valve housing along a first longitudinal axis of the valve housing,
wherein the valve piston is movable by an electromagnetic actuator of the hydraulic valve,
wherein the valve housing forms a hydraulic portion and the electromagnetic actuator forms a magnet portion of the hydraulic valve,
wherein the valve housing includes a supply connection for feeding a hydraulic fluid, at least one operating connection, a first tank connection for draining the hydraulic fluid from the at least one operating connection from the hydraulic portion and a second tank connection for filling the magnet portion and draining the hydraulic fluid from the hydraulic portion,
wherein the first tank connection and the second tank connection are radially oriented and axially adjacent to each other in the valve housing so that no operating connection or supply connection is arranged in the valve housing axially between the first tank connection and the second tank connection,
wherein a divider element is fixed between the second tank connection in the hydraulic portion and the magnet portion,
wherein the divider element is configured to provide a flow connection between the second tank connection in the hydraulic portion and the magnet portion and vice versa, and
wherein the first tank connection is interrupted when the at least one operating connection is not connected with the first tank connection so that no hydraulic pressure is transferable through the flow connection from the hydraulic portion to the magnet portion.

2. The hydraulic valve according to claim 1, wherein the divider element includes a connection channel at an enveloping surface of the divider element to provide the flow connection.

3. The hydraulic valve according to claim 2, wherein the connection channel is configured at least partially offset over a circumference of the divider element.

4. The hydraulic valve according to claim 2, wherein the connection channel is configured labyrinth shaped.

5. The hydraulic valve according to claim 1, wherein the divider element includes a syphon.

6. The hydraulic valve according to claim 5, wherein the syphon forms a section of the connection channel.

7. The hydraulic valve according to claim 5, wherein the syphon is arranged in a direction of the first longitudinal axis between a first section of the divider element and a second section of the divider element in a third section of the divider element.

8. The hydraulic valve according to claim 5, wherein the divider element is elastically deformable at a second section of the divider element that is positionable towards the magnet portion.

9. The hydraulic valve according to claim 8, wherein the second section of the divider element that is positionable towards the magnet portion includes deformable geometries.

10. The hydraulic valve according to claim 1, wherein the divider element is made from a synthetic material.

11. The hydraulic valve according to claim 1, wherein the divider element is fixable by a press fit in the valve housing.

12. An electromagnetic actuator for a hydraulic valve, the hydraulic valve, comprising:
a valve housing; and
a valve piston that is axially movable in the valve housing along a first longitudinal axis of the valve housing,
wherein the valve piston of the hydraulic valve is movable by the electromagnetic actuator and the electromagnetic actuator forms a magnet portion of the hydraulic valve,
wherein the valve housing forms a hydraulic portion of the hydraulic valve,
wherein the valve housing includes a supply connection for feeding a hydraulic fluid, at least one operating connection, a first tank connection for draining the hydraulic fluid from the at least one operating connection from the hydraulic portion and a second tank connection for filling the magnet portion and draining the hydraulic fluid from the hydraulic portion,
wherein a divider element is fixed between the second tank connection in the hydraulic portion and the magnet portion,
wherein the first tank connection and the second tank connection are radially oriented and axially adjacent to each other in the valve housing so that no operating connection or supply connection is arranged in the valve housing axially between the first tank connection and the second tank connection,
wherein the divider element is configured to provide a flow connection between the second tank connection in the hydraulic portion and the magnet portion and vice versa,
wherein the first tank connection is interrupted when the at least one operating connection is not connected with the first tank connection so that no hydraulic pressure is transferable through the flow connection from the hydraulic portion to the magnet portion.

13. The electromagnetic actuator according to claim 12, wherein the divider element is arranged in a pole tube of the electromagnetic actuator or in a valve housing of the hydraulic valve.

14. The electromagnetic actuator according to claim 13, wherein the divider element includes a connection channel at an enveloping surface of the divider element to provide the flow connection.

15. The electromagnetic actuator according to claim 14, wherein the connection channel is configured at least partially offset over a circumference of the divider element.

16. The electromagnetic actuator according to claim 14, wherein the connection channel is configured labyrinth shaped.

17. The electromagnetic actuator according to claim 12, wherein the divider element includes a syphon.

18. The electromagnetic actuator according to claim 17, wherein the syphon forms a section of the connection channel.

19. The electromagnetic actuator according to claim 17, wherein the syphon is arranged in a direction of the longitudinal axis between a first section of the divider element and a second section of the divider element in a third section of the divider element.

20. The electromagnetic actuator according to claim 12, wherein the divider element is elastically deformable in a second section of the divider element that is positionable towards the magnet portion.

21. The electromagnetic actuator according to claim 20, wherein the second section of the divider element that is positionable towards the magnet portion includes deformable geometries.

22. The electromagnetic actuator according to claim 12, wherein the divider element is fixable by a press fit in a housing of the hydraulic valve.

23. A hydraulic valve, comprising:
a valve housing; and
a valve piston that is axially movable in the valve housing along a first longitudinal axis of the valve housing,
wherein the valve piston is movable by an electromagnetic actuator of the hydraulic valve,
wherein the valve housing forms a hydraulic portion and the electromagnetic actuator forms a magnet portion of the hydraulic valve,
wherein the valve housing includes a supply connection for feeding a hydraulic fluid, at least one operating connection, a first tank connection for draining the hydraulic fluid from the at least one operating connection from the hydraulic portion and a second tank connection for filling the magnet portion and draining the hydraulic fluid from the hydraulic portion,
wherein the first tank connection and the second tank connection are radially oriented and axially adjacent to each other in the valve housing so that no operating connection or supply connection is arranged in the valve housing axially between the first tank connection and the second tank connection,
wherein a divider element is fixed between the second tank connection in the hydraulic portion and the magnet portion,
wherein the divider element is configured to provide a flow connection between the second tank connection in the hydraulic portion and the magnet portion and vice versa,
wherein the first tank connection is interrupted when the at least one operating connection is not connected with the first tank connection so that no hydraulic fluid is transferable through the flow connection from the hydraulic portion to the magnet portion, and
wherein the first tank connection is flowable when the at least one operating is connected with the first tank connection so that hydraulic fluid is transferable from the at least one operating connection through the first tank connection and the second tank connection to the magnet portion so that the magnet portion is fillable with the hydraulic fluid from the hydraulic portion.

* * * * *